United States Patent
Steltz et al.

(10) Patent No.: US 9,303,665 B2
(45) Date of Patent: Apr. 5, 2016

(54) ADAPTABLE MATING FASTENER ASSEMBLY

(71) Applicant: ILLINOIS TOOL WORKS INC., Glenview, IL (US)

(72) Inventors: Jeffrey J. Steltz, Chippewa Falls, WI (US); Mark T. Leuthe, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/404,485

(22) PCT Filed: Jun. 3, 2013

(86) PCT No.: PCT/US2013/043926
§ 371 (c)(1),
(2) Date: Nov. 28, 2014

(87) PCT Pub. No.: WO2013/184590
PCT Pub. Date: Dec. 12, 2013

(65) Prior Publication Data
US 2015/0135487 A1 May 21, 2015

Related U.S. Application Data

(60) Provisional application No. 61/655,586, filed on Jun. 5, 2012.

(51) Int. Cl.
*F16B 5/06* (2006.01)
*F16B 21/07* (2006.01)

(52) U.S. Cl.
CPC ............... *F16B 5/06* (2013.01); *F16B 5/0614* (2013.01); *F16B 5/0657* (2013.01); *F16B 21/075* (2013.01); *Y10T 24/45241* (2015.01)

(58) Field of Classification Search
CPC .... F16B 5/0614; F16B 5/0607; F16B 5/0628; F16B 5/0657; F16B 5/065; F16B 21/075; Y10T 24/44026; Y10T 24/309; Y10T 24/45241
USPC .................. 24/716, 297, 3.12, 453, 289, 458, 24/293–296; 248/316.7, 222.11, 317, 322, 248/341, 690, 58, 289.11, 289.31, 290.1; 269/1.08, 214, 146.7; 403/119, 121, 403/161, 113, 117, 150, 157, 159, 162–163
See application file for complete search history.

(56) References Cited

U.S. PATENT DOCUMENTS

| 420,252 | A | * | 1/1890 | Siersdorfer ......... E05B 73/0082 248/317 |
| 6,074,150 | A |  | 6/2000 | Shinozaki et al. |

(Continued)

FOREIGN PATENT DOCUMENTS

| DE | 102004002269 A1 | 8/2005 |
| EP | 2175146 A2 | 4/2010 |

(Continued)

OTHER PUBLICATIONS

ISR and WO for PCT/US2013/043926 mailed Aug. 1, 2013.

*Primary Examiner* — Abigail Morrell

(57) ABSTRACT

A fastening assembly is configured to secure a first component to a second component through a range of connection angles. The fastening assembly may include a female fastening member having at least one retention stud, and a male fastening member having an internal opening configured to pivotally retain the at least one retention stud. The retention stud(s) is configured to be pivotally adjusted within the internal opening in order to securely connect the female fastening member to the male fastening member through the range of connection angles.

18 Claims, 3 Drawing Sheets

(56) References Cited

U.S. PATENT DOCUMENTS

| | | |
|---|---|---|
| 6,796,006 B2 | 9/2004 | Hansen |
| 7,536,755 B2 * | 5/2009 | Nakajima ............... F16B 5/065 24/297 |
| 2006/0085955 A1 | 4/2006 | Asano |
| 2008/0196222 A1 | 8/2008 | Park |
| 2010/0088860 A1 | 4/2010 | Benedetti et al. |
| 2010/0107376 A1 | 5/2010 | Reznar et al. |
| 2010/0303539 A1 | 12/2010 | Aoki et al. |
| 2012/0272487 A1 | 11/2012 | Cooley et al. |

FOREIGN PATENT DOCUMENTS

| | | |
|---|---|---|
| FR | 2938886 A1 | 5/2010 |
| GB | 2334298 A | 8/1999 |
| JP | 0369312 U | 7/1991 |
| WO | 2006132497 A1 | 12/2006 |
| WO | 2010104653 A1 | 9/2010 |

* cited by examiner

ADAPTABLE MATING FASTENER ASSEMBLY

RELATED APPLICATIONS

The present application is a National Phase of International Application Number PCT/US2013/043926 filed Jun. 3, 2013 and relates to and claims priority benefits from U.S. Provisional Patent Application No. 61/655,586 filed Jun. 5, 2012, which is hereby incorporated by reference in its entirety.

FIELD OF EMBODIMENTS OF THE DISCLOSURE

Embodiments of the present disclosure generally relate to fastener assemblies, and, more particularly, to fastener assemblies that include first and second fastening members configured to mate with one another over a range of mating directions.

BACKGROUND

Various components are secured together through fasteners. For example, panels, sheets, frames, and the like may be secured together through fastener assemblies that include a male fastening member that securely mates with a female fastening member.

A known fastener assembly includes a male fastening member that securely mates with a female fastening member. The female fastening member may be urged into a slot of a panel, for example. The female fastening member is configured to securely mate into the slot of the panel. The male and female fastening members mate with each other in a direction that is perpendicular to the plane of the panel. For example, the male fastening member is urged into the female fastening member in the same direction that the female fastening member is urged into the slot of the panel. Once securely connected together, the male and female fastening members are typically set in position. However, in certain applications, a non-perpendicular connection may be desired. Yet, the known fastener assembly is typically incapable of connecting the panel to another component in such an orientation.

SUMMARY OF EMBODIMENTS OF THE DISCLOSURE

Embodiments of the present disclosure provide a fastening assembly configured to secure a first component to a second component through a range of connection angles. The fastening assembly may include a female fastening member having at least one retention stud, and a male fastening member having an internal opening configured to pivotally retain the at least one retention stud. The retention stud(s) is configured to be pivotally adjusted within the internal opening in order to securely connect the female fastening member to the male fastening member through the range of connection angles.

The retention stud(s) may include a rounded ledge. The internal opening may include a curved edge configured to abut into the rounded ledge. In an embodiment, the retention stud(s) includes a circular axial cross-section, and the internal opening is circular and configured to axially secure the at least one retention stud while allowing rotational movement of the retention stud(s). In another embodiment, the retention stud(s) includes a semi-circular axial cross-section.

The at least one retention stud may include opposed first and second retention studs extending from opposed first and second receiving legs, respectively. The first and second retention studs are configured to be inserted into the internal opening from opposite sides.

The male fastening member may include a tongue having a curved leading edge. The internal opening may be formed through the tongue. The female fastening member may include opposed protuberances configured to rotatably retain the curved leading edge.

The male fastening member may also include lateral supports. The lateral supports may include tapered distal ends configured to limit pivotal motion of the male fastening member with respect to the female fastening member.

Certain embodiments of the present disclosure provide a fastening assembly including a female fastening member having opposed receiving legs, wherein each of the opposed receiving legs includes a retention stud. The assembly may also include a male fastening member having an internal opening configured to pivotally retain the retention stud of each of the opposed receiving legs. The retention stud of each of the opposed receiving legs is configured to be pivotally adjusted within the internal opening in order to securely connect the female fastening member to the male fastening member through a range of connection angles.

Certain embodiments of the present disclosure provide a fastening assembly configured to secure a first component to a second component through a range of connection angles. The assembly may include a female fastening member including first and second receiving legs having first and second retention studs, respectively, and first and second protuberances. The assembly may also include a male fastening member including a tongue having a curved leading edge, an internal opening formed through the tongue, and lateral supports on either side of the tongue. The curved leading edge is configured to be pivotally retained between the first and second protuberances. The internal opening is configured to pivotally retain the first and second retention studs, which are configured to be inserted into the internal opening from opposite sides. The first and second retention studs are configured to be pivotally adjusted within the internal opening in order to securely connect the female fastening member to the male fastening member through a range of connection angles. The lateral supports may include tapered distal ends configured to limit pivotal motion of the male fastening member with respect to the female fastening member.

Each of the first and second retention studs may include a rounded portion. The internal opening may include a curved portion configured to abut into the rounded portion.

Figure 1:
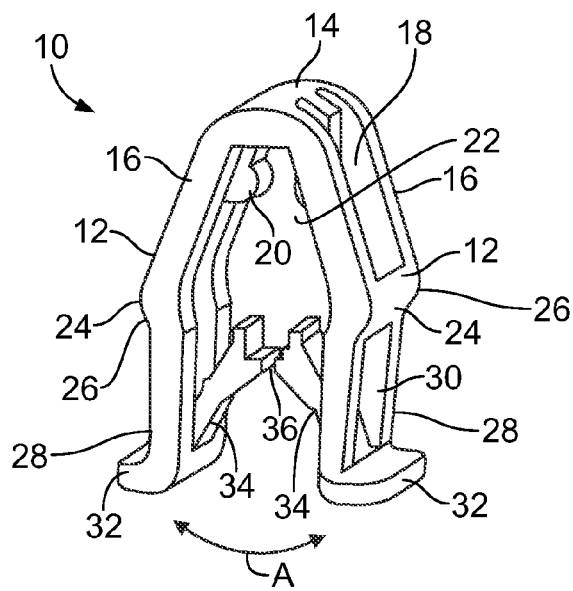
FIG. 1 illustrates an isometric front view of a female fastening member, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates an isometric front view of a first or female fastening member 10, according to an embodiment of the present disclosure. The female fastening member 10 may be integrally molded and formed as a single piece of injection molded plastic. However, the female fastening member 10 may be formed of various other materials, such as metal.

The female fastening member 10 may be a tower that is configured to receive and pivotally retain a male fastening or locking member, as explained below. The female fastening member 10 may be an adapter that is configured to be inserted into an opening of a panel that typically receives another fastening member in a direction that is perpendicular to a front surface of the panel. The female fastening member 10, as an adapter, fits into the opening and is configured to receive a male fastening member in a range of directions or sweep angles with respect to the surface of the panel, as explained below. The female fastening member 10 is "female" in that it is configured to receive the male fastening member. The female fastening member 10 is configured to securely mate to another component, such as a panel, frame, or the like, or may be integrally part of another component. For example, the female fastening member 10 may be integrally connected to a portion of an instrument panel, or a cover, frame, panel, or the like configured to connect to the instrument panel.

The female fastening member 10 includes opposed receiving legs 12 connected together at hinge 14. The hinge 14 allows the opposed receiving legs 12 to flex toward one another in the directions of arc A. The hinge 14 may be inserted into an opening of a panel. During insertion, the opposed receiving legs 12 may flex toward one another and snapably secure into position.

Each receiving leg 12 may include a connection beam 16 that outwardly angles from the hinge 14. A channel 18 may be formed through each connection beam 16. The channel 18 may provide flexibility to the connection beam 16. Optionally, the connection beam 16 may not include the channel 18 if a more rigid connection beam 16 is desired.

The connection beams 16 may include leading edge-engaging protuberances 20 extending inwardly into a space 22 between the opposed receiving legs 12. The protuberances 20 may be proximate to the hinge 14, and may be or include a rounded nub, barb, clasp, or the like configured to slidably engage a leading edge of a tongue of a male fastening member.

Each connection beam 16 may include a transitional panel-retaining ridge 24 at a distal end 26. The panel-retaining ridge 24 may be or include a cross beam that is generally perpendicular to the longitudinal direction of the receiving leg 12. The panel-retaining ridge 24, in turn, integrally connects to an extension beam 28, which may also include an internal channel 30 for flexibility. The extension beams 28 of the opposed receiving legs 12 may be parallel to one another, as shown in FIG. 1.

An upturned tab 32 may integrally connect to a distal end of the extension beam 28. The upturned tab 32 may be perpendicular to a plane of the extension beam 28.

An internally-directed latching arm 34 extends from the junction of the upturned tab 32 and the extension beam 28 toward the internal space 22. The latching arms 34 of the opposed receiving legs 12 are angled toward another and mirror one another. The latching arms 34 are separated by a gap 36.

Figure 2:
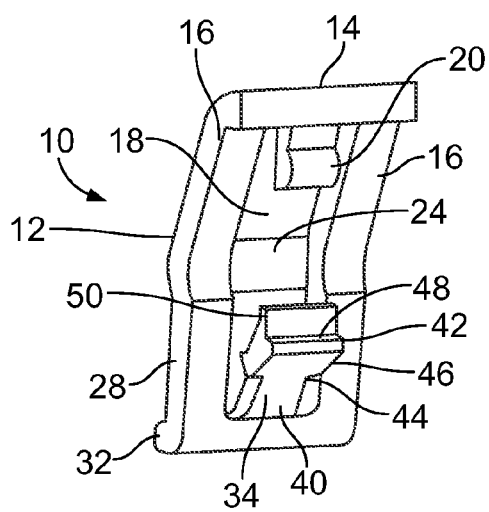
FIG. 2 illustrates an isometric internal view of a receiving leg of a female fastening member, according to an embodiment of the present disclosure.

FIG. 2 illustrates an isometric internal view of the receiving leg 12 of the female fastening member 10, according to an embodiment of the present disclosure. As shown, the latching arm 34 extends upwardly and inwardly from the junction of the upturned tab 32 and the extension beam 28. The latching arm 34 includes an upwardly and inwardly angled column 40 having a retention stud 42 extending from a distal end 44. The retention stud 42 includes a base 46 having a rounded ledge 48 and an upturned flap 50. The retention stud 42 is configured to be inserted and retained within an opening formed through a male fastening member. The rounded ledge 48 may have an arcuate surface that conforms to that of the opening formed through the male fastening member. The upturned flap 50 may be configured to act as a barrier to control motion of the male fastening member with respect to the female fastening member 10.

Figure 3:
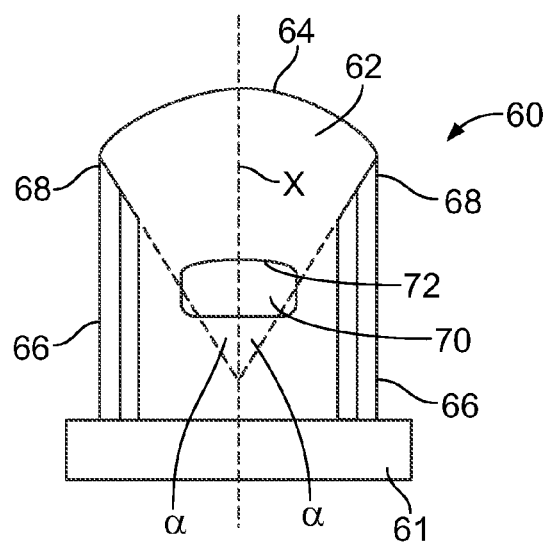
FIG. 3 illustrates a front view of a male fastening member, according to an embodiment of the present disclosure.

FIG. 3 illustrates a front view of a second, male fastening or locking member 60, according to an embodiment of the present disclosure. It is to be understood that the male fastening member 60 may be considered the first fastening member, while the female fastening member 10 may be considered the second fastening member. The male fastening member 60 may be integrally molded and formed as a single piece of injection-molded plastic, for example. Alternatively, the male fastening member 60 may be formed of various other materials, such as metal.

The male fastening member 60 includes a base 61 integrally connected to a planar tongue 62 that is generally perpendicular to the base 61. The tongue 62 includes an outwardly curved or bowed leading or insertion edge 64. Lateral supports 66 extend on either side of the tongue 62. The lateral supports 66 may be thicker than the tongue 62. For example, the lateral supports 66 may be cylindrical tubes that provide structural rigidity to the tongue 62. Each lateral support 66 extends from the base 61 to the curved edge 64. Distal ends 68 of the lateral supports 66 may be tapered and angled down toward a longitudinal axis x. For example, the distal ends 68 may be tapered at an angle α with respect to the longitudinal axis x. Thus, the total angular sweep from one distal end 68 to the other may be 2α.

An internal opening 70 is formed proximate to a center of the tongue 62. The internal opening 70 may include a curved upper edge 72 that conforms to the curvature of the rounded ledges 48 (shown in FIG. 2) of the retention studs 42 of the female fastening member 10. The curved upper edge 72 is configured to cooperate with the rounded ledges 48 of the female fastening member 10 in order to allow the male fastening member 60 to pivot with respect to the female fastening member 10, or vice versa. In general, the internal opening 70 may be larger than the cross-sectional perimeter of the retention studs 42, in order to allow pivotal motion therebetween. The rounded ledges 48 of the retention studs are configured to abut into the curved upper edge 72 of the internal opening 70.

Figure 4:
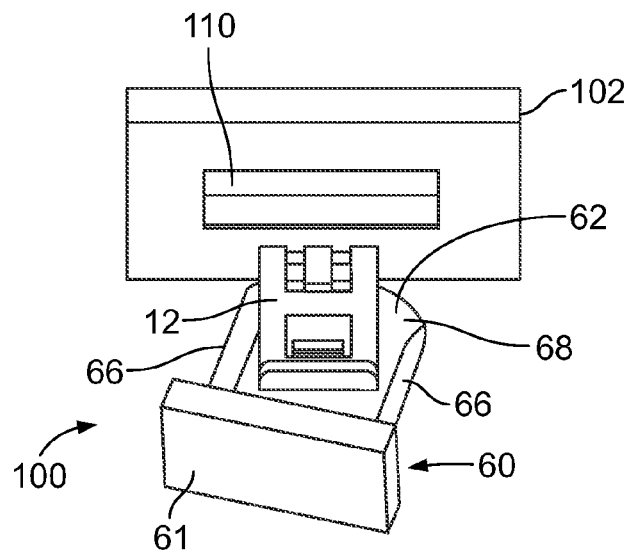
FIG. 4 illustrates an isometric view of a connected fastener assembly being urged into a panel, according to an embodiment of the present disclosure.

FIG. 4 illustrates an isometric view of a connected fastener assembly 100 being urged into a panel 102, according to an embodiment of the present disclosure. Referring to FIGS. 1-4, the female fastening member 10 receives the male fastening member 60 between the opposed receiving legs 12. The planar tongue 62 is inserted between the opposed receiving legs 12 such that the curved leading edge 64 abuts against an internal surface of the hinge 14 and is slidably retained between the rounded protuberances 20.

As the tongue 62 slides into position between the opposed receiving legs 12, the latching arms 34 outwardly deflect over the surface of the tongue 62 until the retention studs 42 encounter the internal opening 70 formed through the tongue 62. Once the retention studs 42 encounter the internal opening 70, the latching arms 34 deflect back to their at-rest positions, thereby causing the retention studs 42 to flex or snap into the internal opening 70 so that the opposed retention studs 42 are retained within the internal opening 70. As such, the tongue 62 is securely trapped between the opposed retention studs 42.

The curved upper edge 72 of the internal opening 70 may conform to the curvature of the rounded ledges 48. The curved leading edge 64 and the curved upper edge 72 allow the male fastening member 60 to pivotally rotate with respect to the female fastening member 10 over an arcuate sweep that may be defined by the tapered edges of the distal ends 68 of the lateral supports 66 of the male fastening member 60. That is, the male fastening member 60 may pivot with respect to the female fastening member 10, or vice versa, over an arcuate sweep of 2α. The distal ends 68 may provide barriers that are configured to abut into lateral surfaces of the receiving legs 12, thereby preventing further pivotal motion.

The distal ends 68 may be tapered at various angles in order to allow a desired amount of pivotal motion between the male fastening member 60 and the female fastening member 10. For example, the angle α may be less than 90°. Optionally, the angle α may be equal to or greater than 90°.

Figure 5:
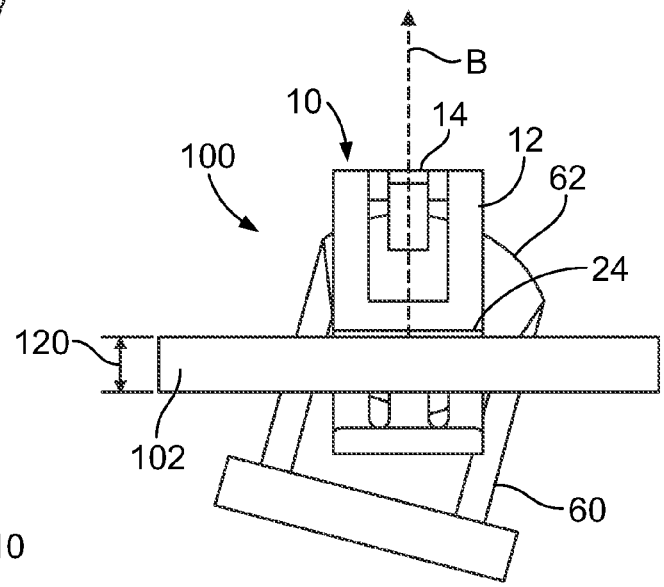
FIG. 5 illustrates a front view of a connected fastener assembly secured to a panel, according to an embodiment of the present disclosure.

FIG. 5 illustrates a front view of a connected fastener assembly 100 secured to the panel 102, according to an embodiment of the present disclosure. Referring to FIGS. 4 and 5, in order to connect the assembly 100 to the panel 102, the male fastening member 60 may first be connected to the female fastening member 10. Optionally, the female fastening member 10 may first be connected to the panel 102, and then the male fastening member 60 may be received by the female fastening member 60. In either case, the hinge end of the female fastening member 10 is inserted into an opening 110 of the panel 102. As the female fastening member 10 is inserted into the opening 110, the opposed receiving legs 12 inwardly deflect until the panel-retaining ridges 24 pass through the opening 110. Once the transition ridges 24 pass through the opening 110, the opposed receiving legs 12 outwardly deflect back to their at-rest positions, and the panel-retaining ridges 24 snapably secure the female fastening member 10 to the panel 102.

The fastener assembly 100 may connect to the panel 102 through various angles other than a direction B that is perpendicular to the plane 120 of the panel 102. In particular, the male fastening member 60 may be moved through various angles with respect to the female fastening member 10. The male fastening member 60 may connect to, and be pivotally moved with respect to, the female fastening member 10 through angles 2α, as shown in FIG. 3, in particular. The curved interfaces between the male fastening member 60 and the female fastening member 10 allow for angular connection and pivotal movement therebetween. The curved interfaces, including the curved leading edge 64/rounded protuberances 20 and the curved interior edge 72/rounded ledges 48 (as shown in FIGS. 1-3, in particular), cooperate with one another to allow the male fastening member 60 to securely mate with the female fastening member 10 over a range of mating directions. That is, the male fastening member 60 may mate with the female fastening member 10 in directions that vary from a direction that is parallel with a longitudinal axis of either the male or female fastening members 60 and 10, respectively.

The curved mating surfaces of the male fastening member 60 may be parallel to reciprocal surfaces on the female fastening member 10. Parallel mating surfaces or radii may provide smooth rotary motion while maintaining a uniform distance between the opening 110 of the panel 102 and the hinge end of the female fastening member 10 that is inserted into the opening 110.

Figure 6:
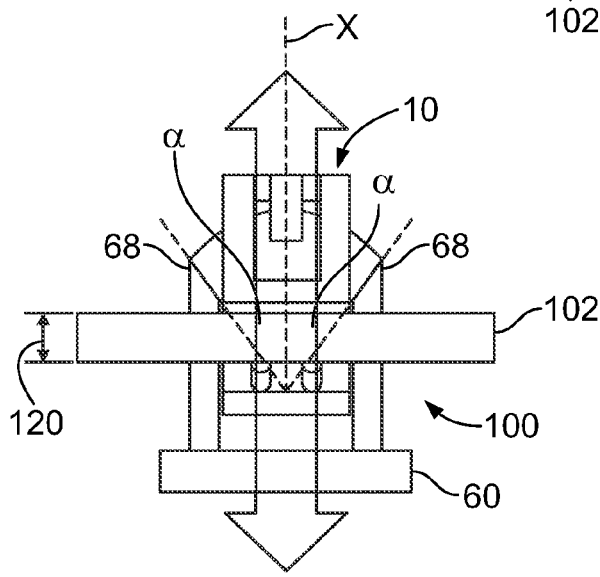
FIG. 6 illustrates a front view of a connected fastener assembly secured to a panel in a direction that is perpendicular to a plane of the panel, according to an embodiment of the present disclosure.

FIG. 6 illustrates a front view of the connected fastener assembly 100 secured to the panel 102 in a direction that is perpendicular to the plane 120 of the panel 102, according to an embodiment of the present disclosure. As explained above, however, the male fastening member 60 may be pivoted through angles α on either side of the longitudinal axis x. As such, the male fastening member 60 may be pivoted, rotated, or otherwise moved with respect to the panel 102, while remaining secured to the panel 102 through the female fastening member 10. In this manner, the fastening member 100 may be used to connect another component to the panel 102 through directions other than parallel to the longitudinal axis x.

Figure 7:
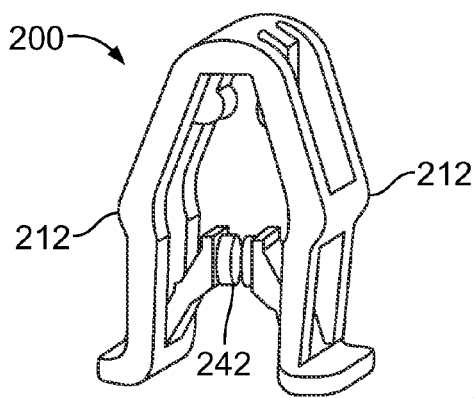
FIG. 7 illustrates an isometric view of a female fastening member, according to an embodiment of the present disclosure.
Figure 8:
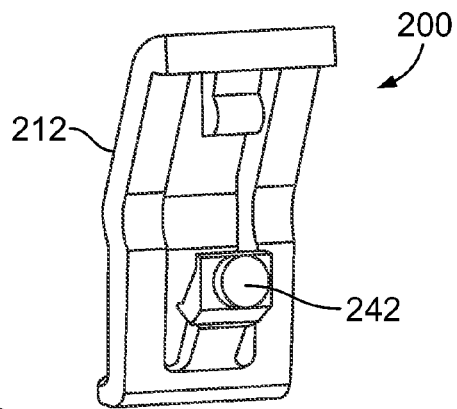
FIG. 8 illustrates an isometric internal view of a receiving leg of a female fastening member, according to an embodiment of the present disclosure.

FIG. 7 illustrates an isometric view of a female fastening member 200, according to an embodiment of the present disclosure. FIG. 8 illustrates an isometric internal view of a receiving leg 212 of the female fastening member 200, according to an embodiment of the present disclosure. Referring to FIGS. 7 and 8, the female fastening member 200 is similar to the female fastening member 10, except that a retention stud 242 extending from each latching arm 234 may be circular in cross-section.

Figure 9:
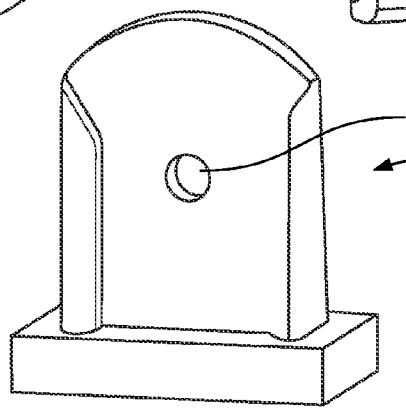
FIG. 9 illustrates an isometric front view of a male fastening member, according to an embodiment of the present disclosure.

FIG. 9 illustrates an isometric front view of a male fastening member 260, according to an embodiment of the present disclosure. The male fastening member 260 is similar to the male fastening member 60, except that an internal opening 270 is circular, and is configured to receive and retain the circular retention stud 242 of the female fastening member 200. Because the internal opening 270 and the retention stud 242 are both circular, the internal opening 270 may be sized and shaped slightly larger than the retention stud 242 in order to receive and rotatably retain the retention stud 242. As such, the internal opening 270 may axially secure the retention stud 242 therein, while allowing rotational movement therebetween.

Figure 10:
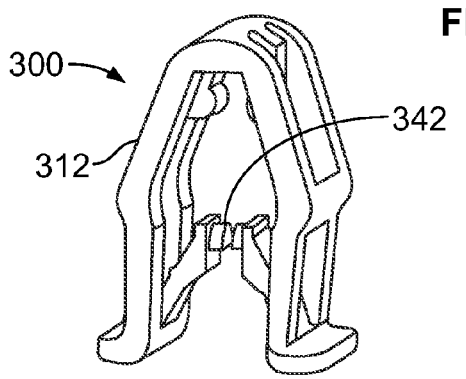
FIG. 10 illustrates an isometric view of a female fastening member, according to an embodiment of the present disclosure.
Figure 11:
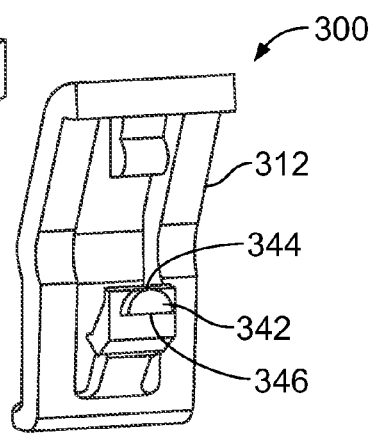
FIG. 11 illustrates an isometric internal view of a receiving leg of a female fastening member, according to an embodiment of the present disclosure.

FIG. 10 illustrates an isometric view of a female fastening member 300, according to an embodiment of the present disclosure. FIG. 11 illustrates an isometric internal view of a receiving leg 312 of the female fastening member 300, according to an embodiment of the present disclosure. Referring to FIGS. 10 and 11, the female fastening member 300 is similar to the female fastening member 200, except that a retention stud 342 extending from each latching arm 334 may be semi-circular in cross-section. The retention stud 342 may include a rounded upper portion 344 and a blunted lower edge 346.

Figure 12:
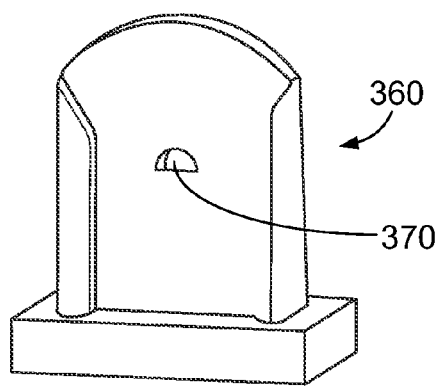
FIG. 12 illustrates an isometric front view of a male fastening member, according to an embodiment of the present disclosure.

FIG. 12 illustrates an isometric front view of a male fastening member 360, according to an embodiment of the present disclosure. The male fastening member 360 is similar to the male fastening member 260, except that an internal opening 370 is semi-circular, and is configured to receive and retain the semi-circular retention stud 342 of the female fastening member 300. Optionally, the internal opening 370 may be circular. The internal opening 370 may be larger than the axial cross section of the semi-circular retention stud 342 in order to allow the retention stud 342 to rotate therein.

The retention studs of the female fastening members described and shown may be curved in order to rotate within cooperating internal openings. Various curved shapes other than those shown may be used that are configured to allow rotational and pivotal motion. In general, the internal openings are sized and shaped to allow pivotal and rotational movement of the retention studs.

Embodiments of the present disclosure are configured to provide full retention at angles that are perpendicular and non-perpendicular to the plane of the panel into which the female fastening member is inserted. Embodiments provide secure fastening engagement between the male and female fastening members in a fixed position. The curved interfaces provide a secure retaining force at varying angles that is not compromised.

Embodiments of the present disclosure provide a fastener assembly having first and second (or male and female) fastening members with matching curved surfaces or radii that allow for insertion into and extraction from a slotted panel at perpendicular and non-perpendicular angles with no reduction in extraction performance. In various applications, such as instrument panels, for example, components may be installed and removed from locations in which non-perpendicular mating is desired. Embodiments may be used in various applications, such as automobile manufacture, such as switch bezels, interior trim, instrument panels, and the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A fastening assembly configured to secure a first component to a second component through a range of connection angles, the fastening assembly comprising:
   a female fastening member having at least one retention stud and opposed protuberances; and
   a male fastening member having an internal opening that pivotally retains the at least one retention stud, wherein the at least one retention stud is pivotally adjustable within the internal opening in order to securely connect the female fastening member to the male fastening member through the range of connection angles, and wherein at least a portion of the male fastening member is pivotally retained between the opposed protuberances of the female fastening member.

2. The fastening assembly of claim 1, wherein the at least one retention stud comprises a rounded ledge, and wherein the internal opening comprises a curved edge configured to abut into the rounded ledge.

3. The fastening assembly of claim 1, wherein the at least one retention stud comprises a circular axial cross-section, and wherein the internal opening is circular and configured to axially secure the at least one retention stud while allowing rotational movement of the at least one retention stud.

4. The fastening assembly of claim 1, wherein the at least one retention stud comprises a semi-circular axial cross-section.

5. The fastening assembly of claim 1, wherein the at least one retention stud comprises opposed first and second retention studs extending from opposed first and second receiving legs, respectively, wherein the first and second retention studs are configured to be inserted into the internal opening from opposite sides.

6. The fastening assembly of claim 1, wherein the male fastening member comprises a tongue, and wherein the at least a portion of the male fastening member comprises a curved leading edge of the tongue, and wherein the internal opening is formed through the tongue.

7. The fastening assembly of claim 1, wherein the male fastening member comprises lateral supports.

8. The fastening assembly of claim 7, wherein the lateral supports include tapered distal ends configured to limit pivotal motion of the male fastening member with respect to the female fastening member.

9. A fastening assembly comprising:
   a female fastening member having opposed protuberances and opposed receiving legs, wherein each of the opposed receiving legs includes a retention stud; and
   a male fastening member having an internal opening that pivotally retains the retention stud of each of the opposed receiving legs, wherein the retention stud of each of the opposed receiving legs is pivotally adjustable within the internal opening in order to securely connect the female fastening member to the male fastening member through a range of connection angles, and wherein at least a portion of the male fastening member is pivotally retained between the opposed protuberances of the female fastening member.

10. The fastening assembly of claim 9, wherein the retention stud of each of the opposed receiving legs comprises a rounded ledge, and wherein the internal opening comprises a curved edge configured to abut into the rounded ledge.

11. The fastening assembly of claim 9, wherein the retention stud of each of the opposed receiving legs comprises a circular axial cross-section, and wherein the internal opening is circular and configured to axially secure the retention studs while allowing rotational movement of the retention studs.

12. The fastening assembly of claim 9, wherein the retention stud of each of the opposed receiving legs comprises a semi-circular axial cross-section.

13. The fastening assembly of claim 9, wherein the retention studs of the opposed receiving legs are configured to be inserted into the internal opening from opposite sides.

14. The fastening assembly of claim 9, wherein the male fastening member comprises a tongue, and wherein the at least a portion of the male fastening member comprises a curved leading edge of the tongue, and wherein the internal opening is formed through the tongue.

15. The fastening assembly of claim 9, wherein the male fastening member comprises lateral supports.

16. The fastening assembly of claim 15, wherein the lateral supports include tapered distal ends configured to limit pivotal motion of the male fastening member with respect to the female fastening member.

17. A fastening assembly configured to secure a first component to a second component through a range of connection angles, the fastening assembly comprising:

a female fastening member including (a) first and second receiving legs having first and second retention studs, respectively, and (b) first and second protuberances; and a male fastening member including a tongue having a curved leading edge, an internal opening formed through the tongue, and lateral supports on either side of the tongue, wherein the curved leading edge is configured to be pivotally retained between the first and second protuberances, wherein the internal opening is configured to pivotally retain the first and second retention studs, wherein the first and second retention studs are configured to be inserted into the internal opening from opposite sides, wherein the first and second retention studs are configured to be pivotally adjusted within the internal opening in order to securely connect the female fastening member to the male fastening member through the range of connection angles, and wherein the lateral supports include tapered distal ends configured to limit pivotal motion of the male fastening member with respect to the female fastening member.

18. The fastening assembly of claim 17, wherein each of the first and second retention studs includes a rounded portion, and wherein the internal opening includes a curved portion configured to abut into the rounded portion.

* * * * *